UNITED STATES PATENT OFFICE 2,622,443

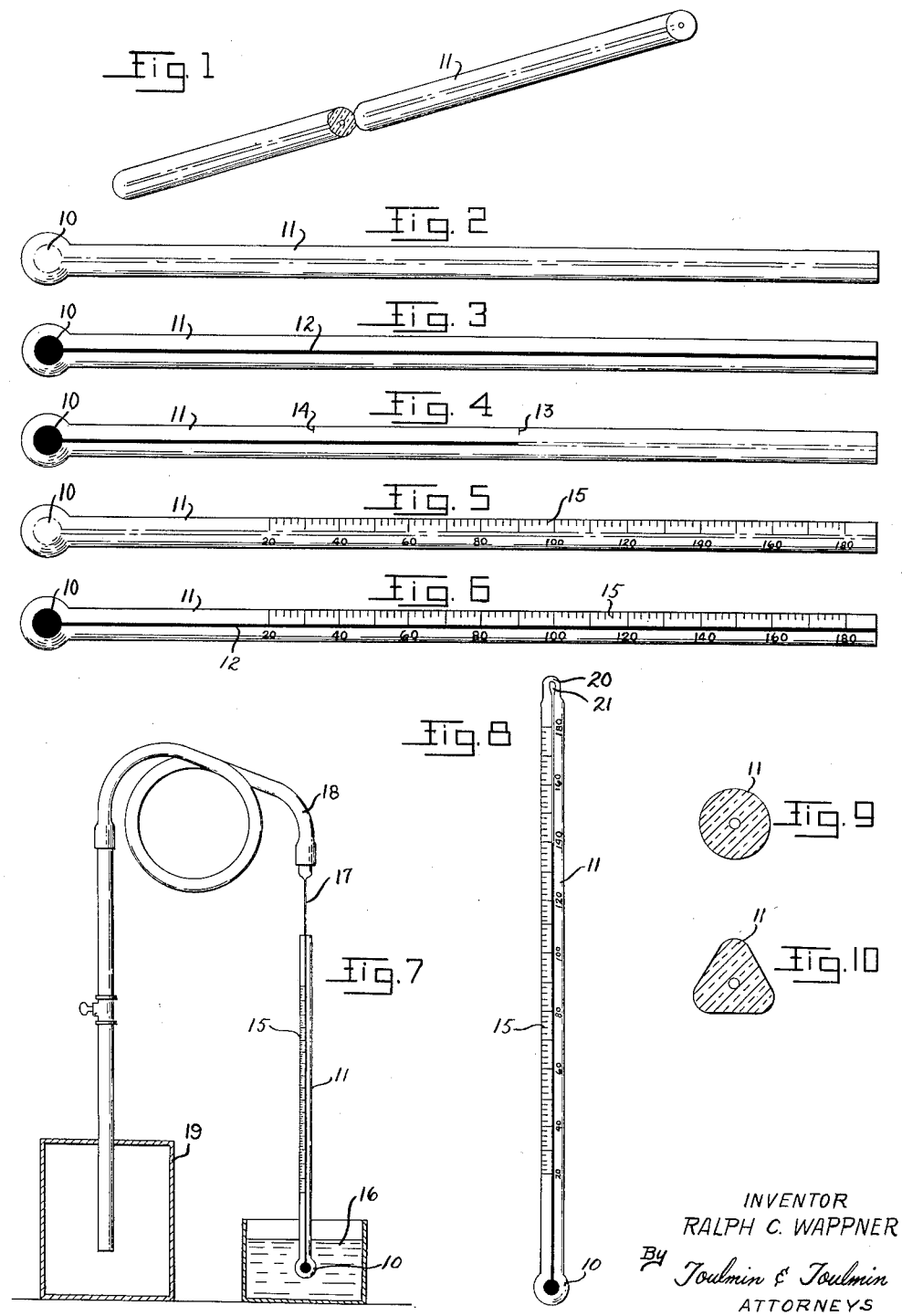

METHOD OF PRODUCING A THERMOMETER HAVING A SCALE FIRED THEREON

Ralph C. Wappner, Springfield, Ohio, assignor to The Ohio Thermometer Co., Inc., Springfield, Ohio, a corporation of Ohio Application October 30, 1948, Serial No. 57,576

5 Claims. (Cl. 73—371)

This invention relates to thermometers, and is concerned primarily with a thermometer of the stirring type, that is, a thermometer which is adapted for being placed directly in solutions or other liquid compositions for the purpose of determining the temperature thereof.

In connection with thermometers of this type it will be evident that it is necessary to have the scale directly on the thermometer tube because many of the materials with which these thermometers are used are alkali or acid and may, additionally, be heated. Any type of scale not directly applied to the thermometer tube, such as a metallic member carrying the thermometer tube, would be destroyed or eaten away by many of these solutions. Accordingly, it is necessary that thermometers of this type have the scale inscribed directly thereon. The preferred present-day method of accomplishing this comprises the steps of filling the thermometer in the usual manner with spirits, thereafter covering the thermometer staff with wax, such as beeswax and then determining the exact scale which is to be applied.

This last step is accomplished by establishing two or more gauge points on the thermometer tube by placing it in baths having accurately controlled temperatures. The levels to which the spirits in the tube rise in these baths is marked on the wax, and then the thermometer stem is divided in any suitable manner into the appropriate divisions and marks cut in the beeswax for the indicia to be carried by the thermometer staff. These indicia usually comprise transversely extending marks of different lengths and numbers associated therewith as is well known in the thermometer art.

After the scale has been applied to the wax by scratching, the stem is then placed in an etching solution, ordinarily hydrofluoric acid, which solution will, of course, have the effect of etching the glass at the points where the wax is scratched through. The wax is then removed, whereupon the etched marks are filled with a black paint or other substance to make the scale readily visible.

It will be evident that a method of this nature is fairly complex and expensive, and as a result, involves a large part of the cost of producing a stirring type thermometer.

Another fault in this system of marking a thermometer is that the substances in which the thermometer is placed during use are often corrosive, such as the acids and alkalis referred to above, and this causes dissolving of the coloring material from the etched marks so that the thermometer is very difficult to read.

Accordingly, the present invention has in view as one of its foremost objects, the production of a new and improved method of inscribing the scale and accompanying indicia on the stem of the thermometer and which method is highly simplified as compared to the one described above.

Still another object is the provision of a method of application to a thermometer tube of a scale of a type such that the scale will not be damaged by corrosive substances such as acids and alkalis in which the thermometer may be placed during use.

More in detail, this invention has as a primary object, the provision of a method of the type indicated which includes, as an essential characteristic, the step of firing the scale marks and indicia on the stem of a thermometer so that the pigment or other coloring material delineating these marks becomes an integral part of the glass stem and is permanently associated therewith.

In carrying out this idea the process begins with the same preliminary steps as the old method, that is, the stem is first formed and filled with spirits in the usual manner but without sealing the tube at its upper end. Two so-called base marks are then inscribed on the stem at spaced intervals by placing the tube in baths of controlled temperature and noting the level of the spirit column therein. These marks may be put on by scratching or etching, by way of example, it will be noted that one of these marks may be the point for 32° Fahrenheit and the other for 90° Fahrenheit. The tube now having the base marks or gauge marks thereon is emptied of spirits in any suitable manner.

An appropriate screen is then placed over the stem in proper relation with respect to these base marks and a ceramic printing ink, commonly known as "frit" is applied over the screen so that the ink comes in contact with and adheres to the stem of the thermometer at the proper points.

The screen is now removed and the stem baked or "fired" at a temperature which is somewhat below the melting point of glass. This temperature ordinarily should be in the neighborhood of 950° Fahrenheit. It is to be noted at this point that the temperature at which the thermometer tubes are fired in order to convert the applied scale to an integral part of the thermometer tube is such that it would not be possible to so manufacture a spirit filled thermometer according to the prior art methods.

The result of the procedure set forth above is a product consisting of a thermometer tube which has the scale and accompanying indicia fired onto the glass stem so as to become fused therewith and constitute, in effect, an integral and permanent part thereof.

The next step according to the process of this invention, is to refill the fired tube with spirits and then to seal the upper end thereof. After this second filling the tube is preferably placed in bath of controlled temperature and the spirit level corrected before sealing in order to insure accuracy of the thermometer and correspondence with the scale applied thereto.

It will be evident that this invention is equally applicable to thermometers of the round type and also to those the stems of which are triangular in cross-section. Accordingly, it is another object of this invention to provide an improved method for applying the scale to both round and triangular thermometers in which the said scale and the indicia associated therewith become an integral part of the thermometer stem. In the case of triangular surfaces the indicia and scale may be applied to the thermometer tube by separate screening processes, but it will be evident that the inventive features of my improved method still obtain.

Various other detailed objects and advantages of this invention such as arise in carrying out the above noted ideas in a practical embodiment will in part become apparent and in part be hereinafter stated as the description of this invention proceeds.

For a full and more complete understanding of this invention, reference may be had to the following description and the accompanying drawings wherein:

Figure 1 is a perspective view showing a piece of tubing for making a thermometer of circular cross-section and represents the first step in the production of a thermometer according to this invention;

Figure 2 is an elevational view showing the tube at the next step of the method of this invention wherein the spirit bulb has been drawn on one end;

Figure 3 depicts the next step in this invention which consists of filling the tube with spirits and then placing the tube in a bath of controlled temperature so that a certain amount of the spirits overflow from the open end of the tube;

Figure 4 illustrates the next step of the method of this invention and wherein the thermometer tube, still unsealed, has been placed in two baths of controlled temperature and gauge marks marked on the tube;

Figure 5 illustrates the tube at the end of the next step wherein the thermometer tube has been emptied of spirits and the scale placed thereon.

Figure 6 illustrates the tube with the spirits replaced therein;

Figure 7 illustrates the next step in the process and wherein the tube with the scale fired thereon is placed in a bath of controlled temperature and the spirit level corrected therein to bring it into register with one of the gauge marks by applying a vacuum to the liquid;

Figure 8 illustrates the tube with the upper end sealed in order to make a finished thermometer;

And Figures 9 and 10 are cross-sections, respectively, of a circular type thermometer tube and a triangular type thermometer tube.

Referring now to the drawings somewhat more in detail, and more particularly Figures 1 through 6 inclusive, the thermometer shown therein is referred to in its entirety by the reference character "T."

The thermometer includes a base or bulb part at 10 and a stem part at 11, the cross-section of which, it will be noted, may be either circular, as shown, or triangular.

The bulb 10 is formed on the end of the thermometer tube according to the usual manufacturing practices comprising heat sealing the end of the tube and then applying air pressure through the tube in order to expand the plastic heated and sealed end to a bulb of the proper dimensions.

The tube so formed is then filled with spirits in any of the usual and well-known methods. After the tube is filled with spirits, it is placed in a bath of predetermined temperature which preferably approximates the maximum temperature in which the thermometer is to be used. This causes the spirits to expand and a certain amount thereof to overflow from the top of the tube. The thermometer tube at this stage of the manufacturing operation is indicated in Figure 3 wherein the spirits in the thermometer are indicated by the reference numeral 12.

After the foregoing step, the tube is placed in another bath of controlled temperature and which temperature is substantially lower than the first. Due to the fact that this second bath is at a lower temperature, the spirits will contract and the upper level thereof will move to a lower level in the thermometer tube. This bath may, for example, be at a temperature of 90° Fahrenheit. A mark is placed on the thermometer tube at this level as indicated at 13 in Figure 4. This mark may be made on the thermometer tube by scratching or filing or in any other manner desired.

Thereafter, the tube is placed in still another bath of controlled temperature, for example 32° Fahrenheit. As before, this still lower temperature causes the spirits in the thermometer tube to contract still further so that the level thereof moves downwardly in the thermometer tube. Another gauge mark as indicated at 14 is marked on the thermometer tube at this point. These two base marks or gauge marks are useful in determining the size scale which is to be applied to the thermometer tube.

The next step in the manufacture of a thermometer according to this invention is to empty the tube of all spirits. This is necessary because the thermometer is to be fired at a temperature approaching the melting point of glass, as will be seen hereinafter. After the thermometer tube has been emptied, a scale is applied thereto in close conformity to the distance between the gauge marks 13 and 14. Preferably, there are provided a plurality of screens for the purpose of applying scales so that the scale applied to the thermometer will conform to the aforementioned gauge marks 13 and 14.

According to this invention, the scale is applied by a silk screen process and by means of a ceramic ink, known as "frit," which is applied to the surface of the thermometer tube through the said screen. This will result in a scale as indicated at 15 in Figure 5 on the thermometer tube, and, as mentioned before, this scale will conform exactly to the gauge marks at 13 and 14.

The next step in the manufacture of the thermometer according to this invention is to subject the thermometer tube to a baking or firing temperature which is somewhat below the melting point of the glass from which the thermometer tube is made. This temperature should be approximately 950° Fahrenheit, and will result in the ceramic ink becoming fused directly to the glass of the thermometer tube so as to constitute, in effect, an integral part thereof. It is to be noted that any suitable coloring of frit can be applied so that the thermometer scale may be readily visible under all circumstances of its use.

After the thermometer tube has been fired, it is cooled and then refilled with spirits as indicated in Figure 6. The refilled tube is then subjected to a temperature approximately equal to that employed in the step shown in Figure 3 and wherein the spirits are permitted to expand within the thermometer tube and to overflow. At the end of this step the amount of spirits remaining in the tube should be almost exactly that which will conform to the scale applied to the tube. However, in order to insure a high degree of accuracy of the thermometer, an additional step is carried out and which is depicted in Figure 7.

In Figure 7 the thermometer tube which has the scale fired thereon and which has been refilled is indicated as being placed in a bath 16 of accurately controlled temperature. This bath will cause the spirits in the thermometer tube to assume such a volume that the upper level in the tube thereof should correspond to a certain point on the scale which has been fired thereon. In order to bring the upper level of the spirits in the tube into exact conformity with the scale fired thereon, a very thin hollow needle as indicated at 17 may be inserted into the tube and a vacuum applied to the said needle as by the hose 18 which leads to a vacuum source 19 of any suitable nature. The needle 17 having the vacuum draw thereon is effective to draw spirits from the tube of the thermometer and to bring the level thereof to exact alignment with the proper scale mark.

After carrying out the steps in Figure 7, if necessary, the thermometer tube is then sealed at its upper end as at 20 in Figure 8. Preferably, a slight bulb as indicated at 21 in Figure 8 is formed at the top by first sealing the end of the tube closed and then dipping the thermometer in a hot solution so that the spirits are forced upwardly therein and bring about an expansion of the sealed and soft glass to form the said bulb. This bulb is for the purpose of permitting the thermometer to be used at somewhat over the maximum temperature indicated thereon without it immediately breaking.

A completed thermometer which has been manufactured according to the process described above now has a scale thereon which is an integral part of the thermometer tube. The thermometer can thus be used in alkalis and acids and other substances which, while they do not attack glass, would attack any coloring material which it might be possible to place in an etched scale and would also attack any other scale-bearing means, such as a metallic member, which might be associated with the said thermometer tube. It will be noted that, as is also the case with scales etched directly onto thermometer tubes, the scale applied to a thermometer tube according to this invention is integral therewith and, therefore, the accuracy of the thermometer remains throughout its life.

While the method of this invention has been described in connection with a thermometer tube which is circular in cross-section and to which the scale and indicia can therefore be applied by a single screening operation, it will be evident that all of the advantages of this method obtain where it is necessary, or desirable, to apply the scale proper and the indicia proper to the thermometer scale by separate screening processes. This latter may be the case in connection with triangular thermometer tubes, or those which are formed so as to have a lens surface at the front.

It is also to be noted that by utilizing the ceramic ink or frit for applying the scale, the thermometer tube is fired at a temperture at which it will not warp, thus, the firing on of the scale is not accompanied by any warping of the glass. The bulb which has previously been drawn on the thermometer tube, therefore, does not change in size and the fired-on scale can be depended on to be in conformity with the characteristics of the thermometer.

It is evident that the product resulting from the above outlined method is equally adapted for use under practical conditions as compared to the thermometer produced by the older methods. As a matter of fact, the ink defining these scales and indicia is more permanently attached, in that it is actually fused to the glass.

The important factor is that the manufacturing operation is highly simplified as compared to the now-known methods and may be carried out at a greatly reduced cost as compared to these methods.

While preferred embodiments of the invention are hereinbefore set forth, it is to be clearly understood that the invention is not to be limited to the exact steps and methods illustrated and described, because various modifications of these details may be provided in putting the invention into practice within the purview of the appended claims.

I claim:

1. The method of manufacturing a thermometer which includes the steps of: drawing a bulb on one end of the thermometer tube; filling the tube with the liquid to be employed therein; placing the tube into baths of different controlled temperatures and inscribing gauge marks thereon at the levels that the liquid stands in the tube in the said baths; emptying the liquid from the tube; applying a scale to the tube in conformity with the aforementioned gauge marks and by a ceramic ink; baking the thermometer tube at a temperature below the melting point of the glass from which it is formed; refilling the tube with liquid; and sealing the open end of the tube.

2. In the method of manufacturing a thermometer; determining spaced gauge points on the thermometer tube after it has had the liquid receiving bulb formed thereon and before sealing the upper end thereof by placing liquid in the tube and then placing the tube in a plurality of baths of different controlled temperatures; emptying the liquid from the tube; applying the scale and indicia therefor to the tube by a ceramic ink; and then firing the ceramic ink onto the tube at a temperature below the melting point of the glass of the tube.

3. The method of manufacturing a thermometer which includes the steps of: determining spaced gauge points on the thermometer tube by placing it in baths of different controlled temperatures after the said tube has been filled with liquid, but prior to sealing the upper end thereof; emptying the liquid from the thermometer tube; applying a scale corresponding to the said gauge marks by a ceramic ink; and firing the scale onto the tube at a temperature below the melting point of the glass of the tube.

4. The method of manufacturing a thermometer which includes the steps of: determining spaced gauge points on the thermometer tube by placing it in baths of different controlled temperatures after the said tube has been filled with liquid, but prior to sealing the upper end thereof; emptying the liquid from the thermometer tube; applying a scale corresponding to the said gauge marks by a ceramic ink; and firing the scale onto the tube at a temperature below the melting point of the glass of the tube; and thereafter replacing liquid in the tube and sealing the open end of said tube.

5. In a method of manufacturing thermometers; forming a liquid receiving bulb on the end of the stem of the thermometer; placing liquid in the thermometer; heating the thermometer to cause some of the liquid to overflow at the open end of the thermometer and retain therein a given volume of liquid; placing the thermometer in a plurality of baths at different controlled temperatures and marking on the thermometer tube the levels assumed by the liquid in the thermometer in the said baths; emptying the liquid from the thermometer tube; applying a scale to the thermometer tube by ceramic ink in accordance with the marks placed on the tube; firing the scale onto the tube at a temperature below the melting point of the glass of the tube; refilling the thermometer tube with liquid of at least said given volume; placing the thermometer tube in a bath at controlled temperature and correcting the liquid level by adjusting the said volume of liquid in the thermometer and sealing the open end of the thermometer to complete the manufacture thereof.

RALPH C. WAPPNER.

REFERENCES CITED

The following references are of record in the file of this patent:

UNITED STATES PATENTS

| Number | Name | Date |
|---|---|---|
| 398,851 | Schulze-Berge | Mar. 5, 1889 |
| 821,141 | Ude | May 22, 1906 |
| 1,405,231 | Krigel | Jan. 31, 1922 |
| 1,862,366 | Boyer | June 7, 1932 |

FOREIGN PATENTS

| Number | Country | Date |
|---|---|---|
| 418,357 | Germany | July 30, 1924 |